(12) United States Patent
Kong et al.

(10) Patent No.: US 6,480,000 B1
(45) Date of Patent: Nov. 12, 2002

(54) DEVICE AND METHOD FOR MEASUREMENT OF RESISTIVITY OUTSIDE OF A WELLPIPE

(75) Inventors: Fan-Nian Kong, Oslo (NO); Harald Westerdahl, Dal (NO); Terje Eidesmo, Ranheim (NO); Svein Ellingsrud, Trondheim (NO)

(73) Assignees: Den Norske Stats Oljeselskap A.S., Stavanger (NO); Norges Geotekniske Institutt, Oslo (NO)

( * ) Notice: Subject to any disclaimer, the term of this patent is extended or adjusted under 35 U.S.C. 154(b) by 0 days.

(21) Appl. No.: 09/719,636

(22) PCT Filed: Jun. 17, 1999

(86) PCT No.: PCT/NO99/00199

§ 371 (c)(1),
(2), (4) Date: Feb. 27, 2001

(87) PCT Pub. No.: WO00/00850

PCT Pub. Date: Jan. 6, 2000

(30) Foreign Application Priority Data

Jun. 18, 1998 (NO) .............................................. 982827

(51) Int. Cl.⁷ .................................................. G01V 3/30
(52) U.S. Cl. ......................................... 324/338; 166/66
(58) Field of Search ................................. 324/338, 339, 324/323, 324; 166/66

(56) References Cited

U.S. PATENT DOCUMENTS

| | | | |
|---|---|---|---|
| 4,810,970 A | * 3/1989 | Warren et al. ............... | 324/338 |
| 4,849,699 A | 7/1989 | Gill et al. .................... | 324/339 |
| 5,157,605 A | 10/1992 | Chandler et al. ........... | 364/422 |
| 5,233,304 A | 8/1993 | Hubans ....................... | 324/323 |
| 5,303,773 A | 4/1994 | Czernichow et al. ......... | 166/66 |
| 5,335,542 A | 8/1994 | Ramakrishnan et al. ...... | 73/152 |
| 5,497,321 A | 3/1996 | Ramakrishnan et al. ..... | 364/422 |
| 5,552,786 A | 9/1996 | Xia et al. ..................... | 324/22 |
| 5,680,049 A | 10/1997 | Gissler et al. .............. | 324/368 |
| 5,732,776 A | 3/1998 | Tubel et al. ........... | 166/250.15 |

FOREIGN PATENT DOCUMENTS

| | | |
|---|---|---|
| EP | 0 656 547 B1 | 11/1999 |
| GB | 2 276 723 | 10/1994 |
| WO | 98/12417 | 3/1998 |

* cited by examiner

*Primary Examiner*—Walter E. Snow
(74) *Attorney, Agent, or Firm*—Foley & Lardner

(57) ABSTRACT

The invention is a device for measuring and surveillance of resistivity in a petroleum reservoir in a geological formation with an injection-, observation- or production well comprising an electrically conductive metallic well tubing, with the new and inventive being characterized by the following features: a) an electrical energy source; b) at least one inductive transmitter antenna for electromagnetic waves, fixedly arranged in the well, outside of the well tubing's outer metallic surface; c) at least one series of sensors comprising n inductive resistivity sensors ($5a, 5b, \ldots, 5n$) arranged for receiving the electromagnetic waves and generation of measurement signals, fixedly arranged in the well, by the petroleum reservoir and outside the well tubing's outer metallic surface; and d) a signal conductor for the measurement signals.

26 Claims, 11 Drawing Sheets

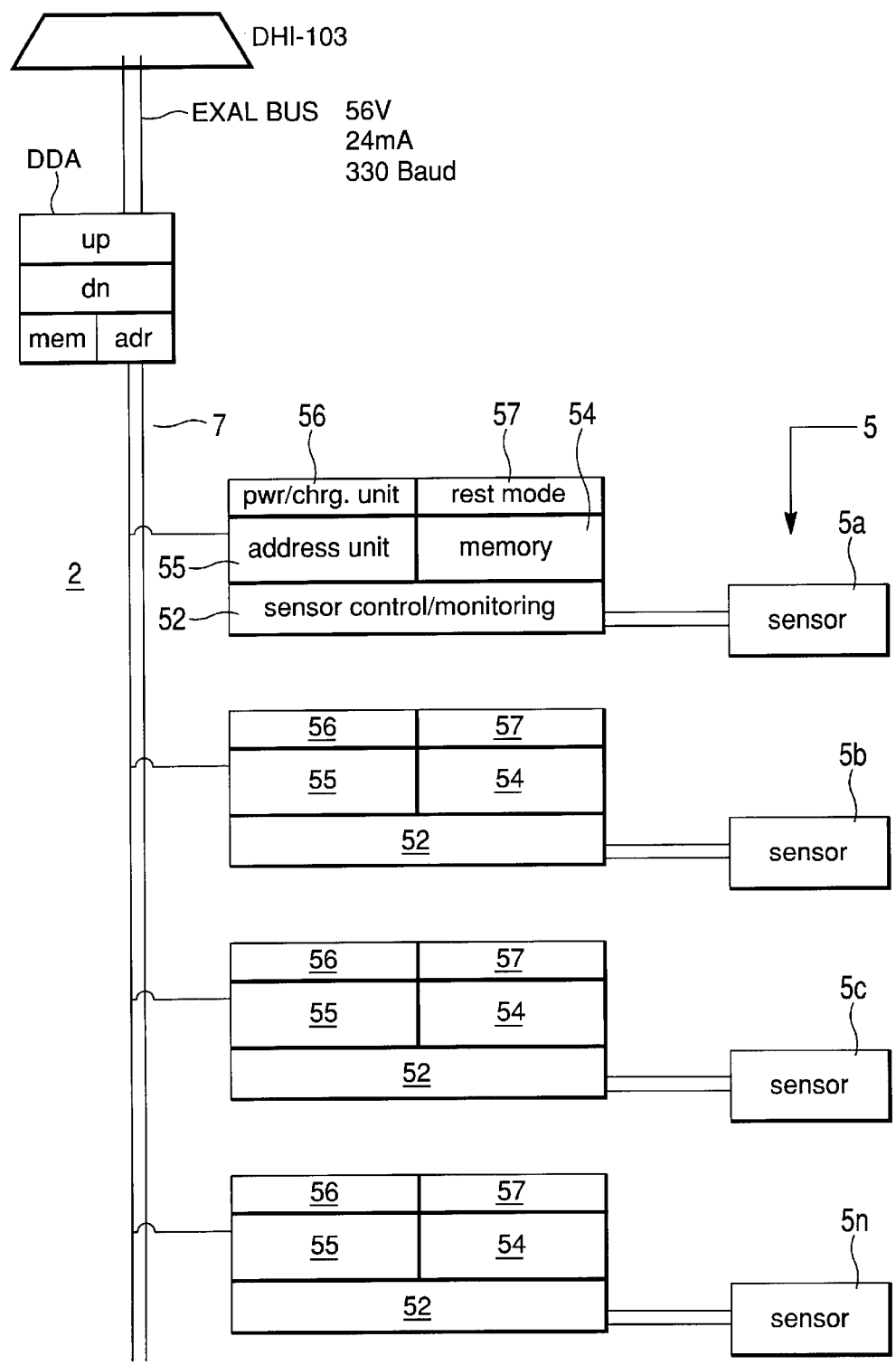

DEVICE AND METHOD FOR MEASUREMENT OF RESISTIVITY OUTSIDE OF A WELLPIPE

FIELD OF INVENTION

This invention concerns an invention to measure resistivity in the geological formations surrounding a well in a petroleum reservoir. More particularly, a measuring device is described, consisting of a transmitter antenna and a series of receiver antennas placed outside the lining pipe in an injection well or a production well.

BACKGROUND OF THE INVENTION

During injection of water through an injection well in a petroleum reservoir it may be very useful with monitoring of the state of the reservoir. Of particular importance is to perform monitoring of the so-called oil/water contact (OWC) being the boundary surface between the usually overlying oil and the underlying water in the permeable rocks constituting the reservoir, e.g. sandstone or limestone. If water under large pressure is injected below OWC this may result in pressure increase in the oil- and gas reservoir above OWC, and result in increased outflow of oil and gas from production wells being in hydraulic communication with the injection well. A device and a method according to the invention will be used both in injection wells and production wells in order to measure and perform monitoring of the electrical properties in the reservoir to indicate, among other things, the position of the oil/water contact and its movement. It is very difficult to perform measurements of the resistivity in the geological formations if one has to measure through the wall of a metallic lining (casing) pipe, an injection pipe or production tubing. For observation of the oil/water contact's level changes it is therefore highly uncertain to perform such observations through the wall of the wellpipe. Further, in order to care for the flow capacity, it is not convenient to arrange measuring devices inside a wellpipe during normal operation of the well.

Below will be given a simplified summary of some of the factors which affect the propagation of electromagnetic waves in a rock. According to the invention there will be emitted, from the transmitter antenna, electromagnetic waves in the form of continuous, sweep or pulsed waves. These pulses are refracted in the rock strata relatively shallowly in the geological formation so that a part of the energy is picked up in the receiver antennas.

The attenuation or reduction of the energy of the electromagnetic signal happens essentially due to three main factors:

I. geometrical, approximately spherical dispersion,

II: electrical properties (resistivity and dielectric) and

III: backscattering (homogenous backscattering from reflecting geological electrically conductive more or less homogenous horizons, and occasional backscattering due to reflecting mineral particles).

AboutI: The geometrical, approximately spherical dispersion follows approximately $1/r^3$ with r being the distance between transmitter and receiver.

AboutII: The electrical properties is the resistivity and the varying dielectric (called the "dielectric constant".) The relative dielectric constant varies from 6 for 20%-porous oil saturated quartz sand to ca. 13 for water saturated 20%-porous quartz sand. The resistivity in the rocks also determines the attenuation of the electromagnetic pulses. In FIG. 5 the attenuation in dB/m is displayed as function of frequencies between 1 and 16 MHz, for resistivities between 5 $\Omega$m and 30 $\Omega$m. The resistivity of oil sand in the reservoir may be between 20 and 200 $\Omega$m. The resistivity of rocks containing formation water, below the oil/water contact (OWC) is between 0.5 and 5 $\Omega$m. Thus the electromagnetic pulses will be attenuated much more while the transmitter- or receiver antennas are situated below the oil/water contact OWC than while the receiver antennas find themselves surrounded by oil-saturated sandstone.

AboutIII: Backscattering or reflection occurs from geological or fluid surfaces being homogenously continuous at an extent of comparable with the wavelength of the electromagnetic waves. For the actual rocks this is for wavelengths between 2 and 8 MHz crudely estimated from 10 to 2 meters. In this invention's connection this reflection a pure loss of signal.

AboutIII: Occasional backscattering happens especially by point reflection from electrically conductive mineral grains in the rocks, e.g. pyrite, haematite and magnetite. Examples of the Known Art.

An apparatus for measurement of formation resistivity through casing pipes is given in U.S. Pat. No. 5,680,049. The U.S. patent has electrodes being pressed against the casing pipe from a logging sonde by means of hydraulics. The logging thus occurs through an electrically conducting casing pipe which will mask the much lower conductivity (i.e. higher resistivity) in the rocks outside the casing pipe.

One method for more direct measurement of formation resistivity and reservoir monitoring outside a casing pipe is given in U.S. Pat. No. 5,642,051. Electrodes are cemented fixed in the well outside the casing pipe in hydraulically isolated zones of the reservoir. A current is sent between an electrode in the ground outside the reservoir and the electrodes in the well. In column 2 in U.S. Pat. No. 5,642,051 is described that an electrical isolation is required on the outside of the casing pipe. In this way one may regard the method for less actual for most purposes, as one must take into account that smaller and larger rifts in the isolation around the casing pipe must be expected during the installment, especially for petroleum wells below the seabed. It is also very difficult to imagine communication with electrodes in a production or injection well by means of electrically conducting in the seabed, as the wellstring from a floating platform will be impossible to isolate electrically.

An electromagnetic pulse transmitter is described in U.S. Pat. No. 4,849,699. In the actual U.S. patent the pulser is designed into a logging tool which by definition is arranged to be displaced through a borehole or a lined well.

Another pulse induction logging tool is described in U.S. Pat. No. 4,481,472.

SUMMARY OF THE INVENTION

One aspect of the present invention is
Solution to the problem.

A device and a method to measure resistivity in the geological formations outside a wellpipe, e.g. in the form of a production-, injection- or casing tube is given by the following patent claims defining this invention. The invention is a device for measurement and monitoring of resistivity in a petroleum reservoir in a geological formation with an injection-, observation- or production well comprising an electrically conductive metallic wellpipe, with the new and inventive being characterized by the following features:

a) an electrically energy source;

b) at least one inductive transmitter antenna for electromagnetic waves, fixedly arranged in the well, outside the wellpipe's outer metallic surface;

c) at least one sensor series comprising n inductive or possibly magnetostrictive or electrostrictive resistivity sensors (5a, 5b, . . . , 5n) arranged for receiving the electromagnetic waves and generation of measurement signals, fixedly arranged in the well, by the petroleum reservoir and outside of the wellpipe's outer metallic surface; and d) a signal conductor for the measurement signals.

The invention also comprises a method for measurement of resistivity in a petroleum reservoir in a geological formation with an observation- or production well by means of a device being defined above, characterized in that it comprises the following steps:

i) emission of electromagnetic waves from the inductive transmitter antenna to preferably the upper part of the petroleum reservoir, ii) reception of electromagnetic waves by a sensor series consisting of n inductive or possibly magnetostrictive or electrostrictive resistivity sensors (5a, 5b, . . . , 5n) arranged by the petroleum reservoir;

iii) generation of signals representing the electromagnetic waves sensed by the resistivity sensors (5a, 5b, . . . , 5n); and iv) registration of signal representations of the signals.

Additional features by the invention is given in the dependent claims.

BRIEF DESCRIPTION OF THE DRAWINGS

Below a description of the invention will be given, with reference to the following drawing figures, with:

FIG. 9 displays an illustration of the main features in a communication device for application with the invention.

DETAILED DESCRIPTION OF THE PREFERRED EMBODIMENTS

Figure 1:
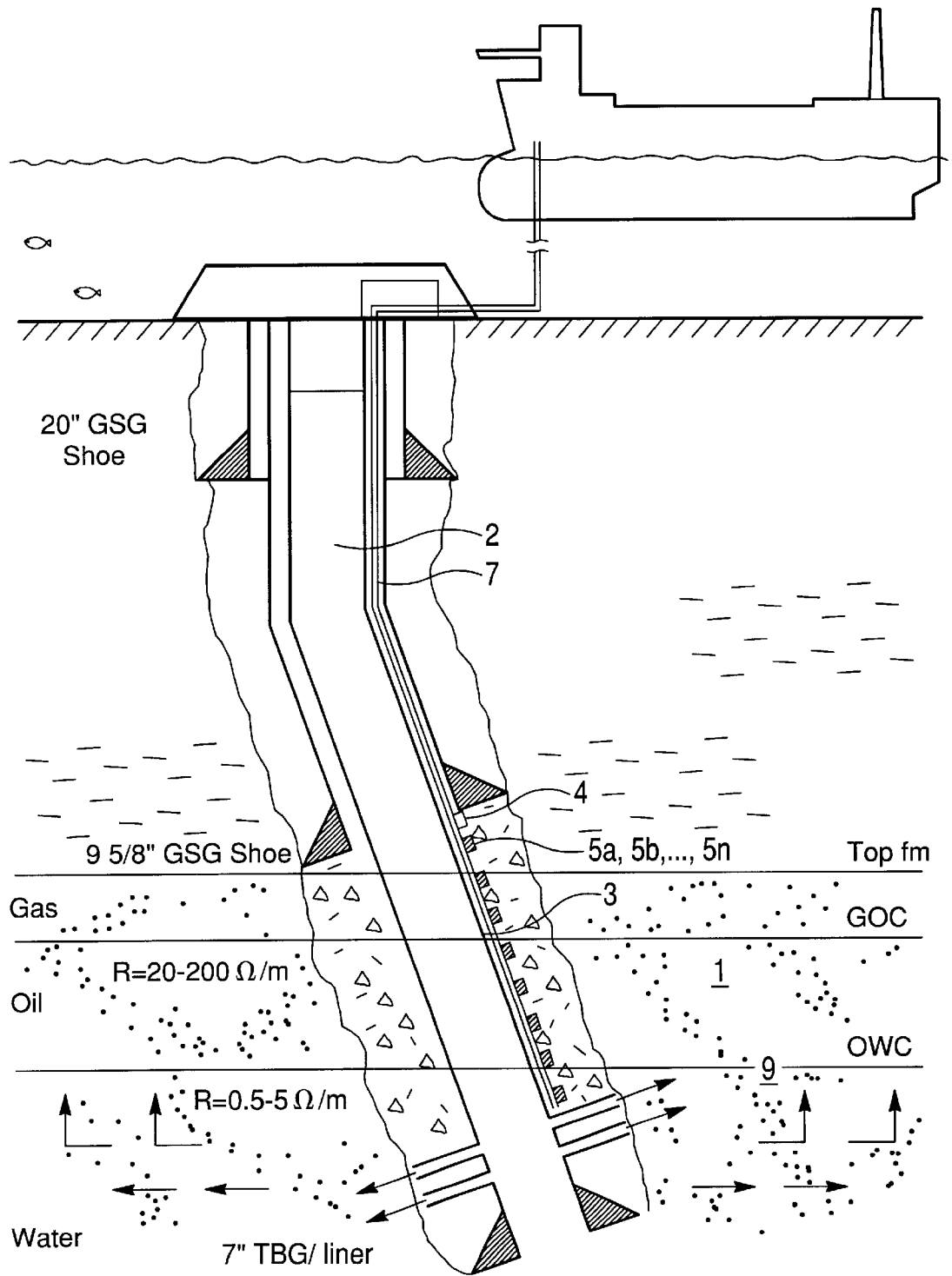
FIG. 1 illustrating in principle an injection well at an oilfield at sea. The injection well is attached to a well frame or wellhead and has a pipe connection with a production vessel at the surface.
Figure 2A:
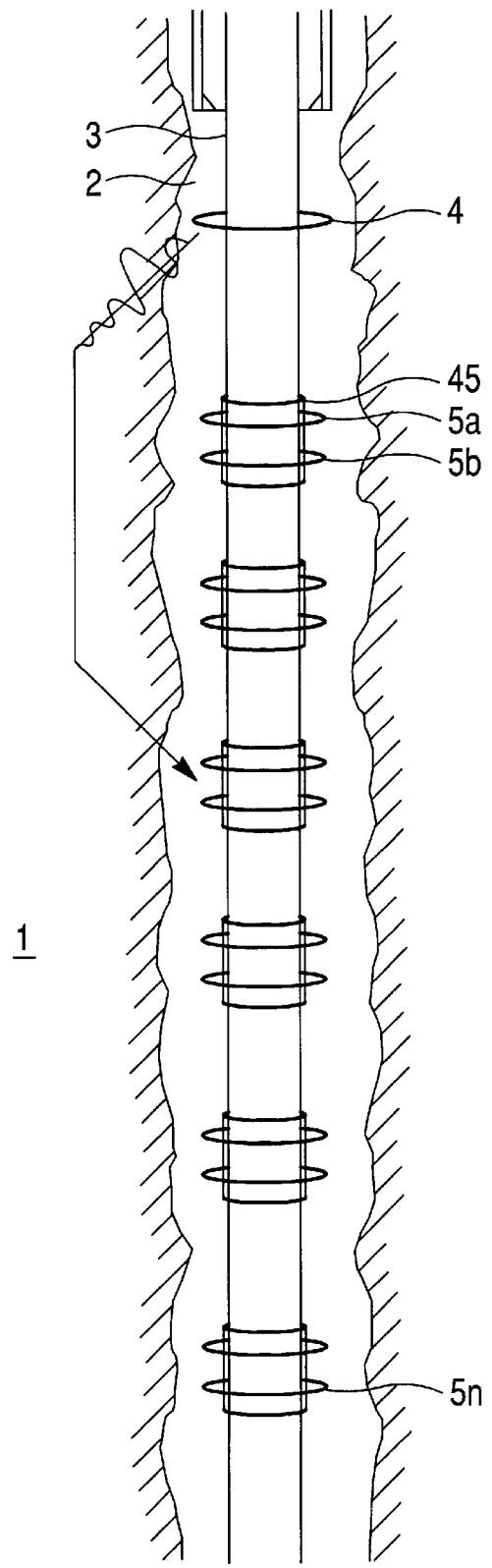
FIG. 2a displays schematically an embodiment of the invention with a transmitter antenna and a sensor series in a petroleum well, with the sensor series possibly consisting of electric coils or antennas.
Figure 2B:
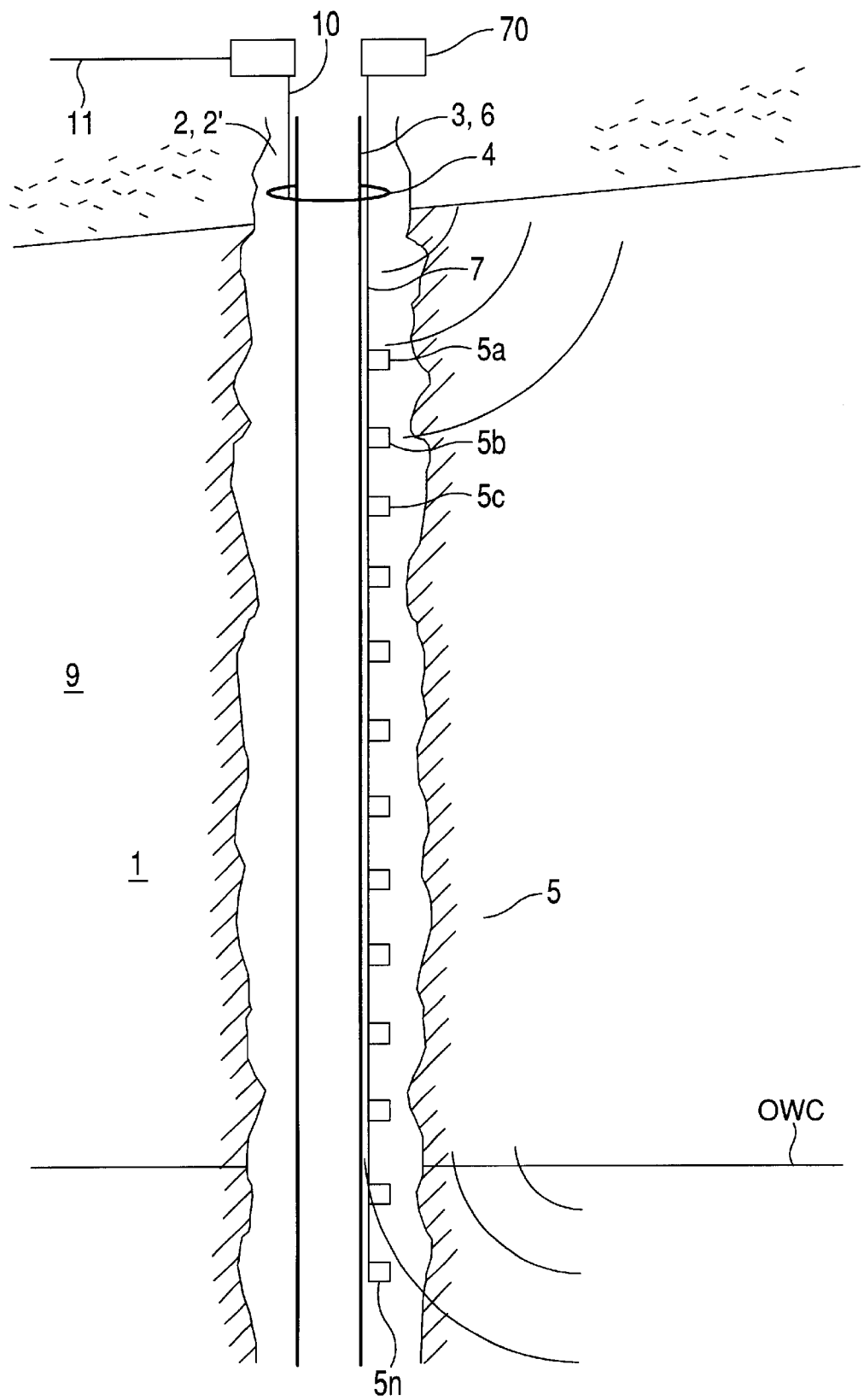
FIG. 2b displays schematically an alternative embodiment of the invention with a transmitter antenna and a sensor series in a petroleum well, with the sensor series possibly consisting of optical sensors arranged to sense electromagnetic signals.

FIG. 1 and FIGS. 2a and 2b display an injection-, observation- or production well 2. The well may comprise an electrically conductive metallic wellpipe 3, e.g. an injection- or production tubing 3 and possibly comprising a perforated or permeable liner pipe 6. These electrically conductive wellpipes may constitute the mechanical basis for the transmitter antenna 4 and a sensor series 5 according to the invention. A metallic pipe outside the transmitter antenna 4 or sensors 5 will attenuate the signals to a high degree. Essential in this connection is that if a liner or casing pipe 6 is arranged outside the production tubing, the transmitter antennas 4 and the resistivity sensors (5a, 5b, . . . , 5n) constituting the sensor series 5 are arranged and fixed also outside of this outer metallic surface in the well. In a preferred embodiment of the invention the antennas are arranged such that no electrically disturbing fluid flow pass between the antenna and the borehole wall. In a preferred embodiment of the invention the transmitter antennas 4 and the sensor series 5 is cemented fixed together with the wellpipe 3,6. The invention is in the preferred embodiment especially arranged for being installed in an injection well, but also possible to being installed in production- or observation wells. Water may be injected in a perforated zone of the wellpipe into a water-bearing part of a reservoir 1 in a geological formation 9. The resistivity in the water-bearing zone typically is 0.5 to 5 $\Omega$m such as indicated in FIG. 1. The resistivity in the oil-bearing part of the reservoir 1 typically is between 20 and 200 $\Omega$m, with little change by the transition to the gas-bearing zone.

General Embodiment.

An electronic energy source or accumulator 10' is arranged preferably near the at least one inductive transmitter antenna 4 being arranged for emission of electromagnetic waves 40. The transmitter antenna 4 is fixedly arranged in the well 2, outside the wellpipe's 3,6 outer metallic surface, and in a preferred embodiment generally such that no electrically disturbing fluid flow may pass between the antenna and the borehole wall. At least one sensor series 5 comprising n inductive resistivity sensors (5a, 5b, . . . , 5n) arranged for reception of the electromagnetic waves 40 and generation of measurement signals 42, are fixedly arranged in the well 2, 2', by the petroleum reservoir 1 and outside the wellpipe's 3, 6 outer metallic surface. The present invention gives in a preferred embodiment a volumetrically measured resistivity, not by means of electrodes arranged for measurement of resistivity by direct electrical contact with the formation. The fixed arrangement in the well 2 of the antennas is preferably performed by fixation cementing by means of cement. Fixation by means of hardening mass as glue etc. may be imagined. A signal conductor 7 for the measurement signals 42 leads to a registration unit 70 for signal representations 44 of the signals 42, which further represent the electromagnetic waves 40 sensed by the resistivity sensors (5a, 5b, . . . , 5n).

Figure 3:
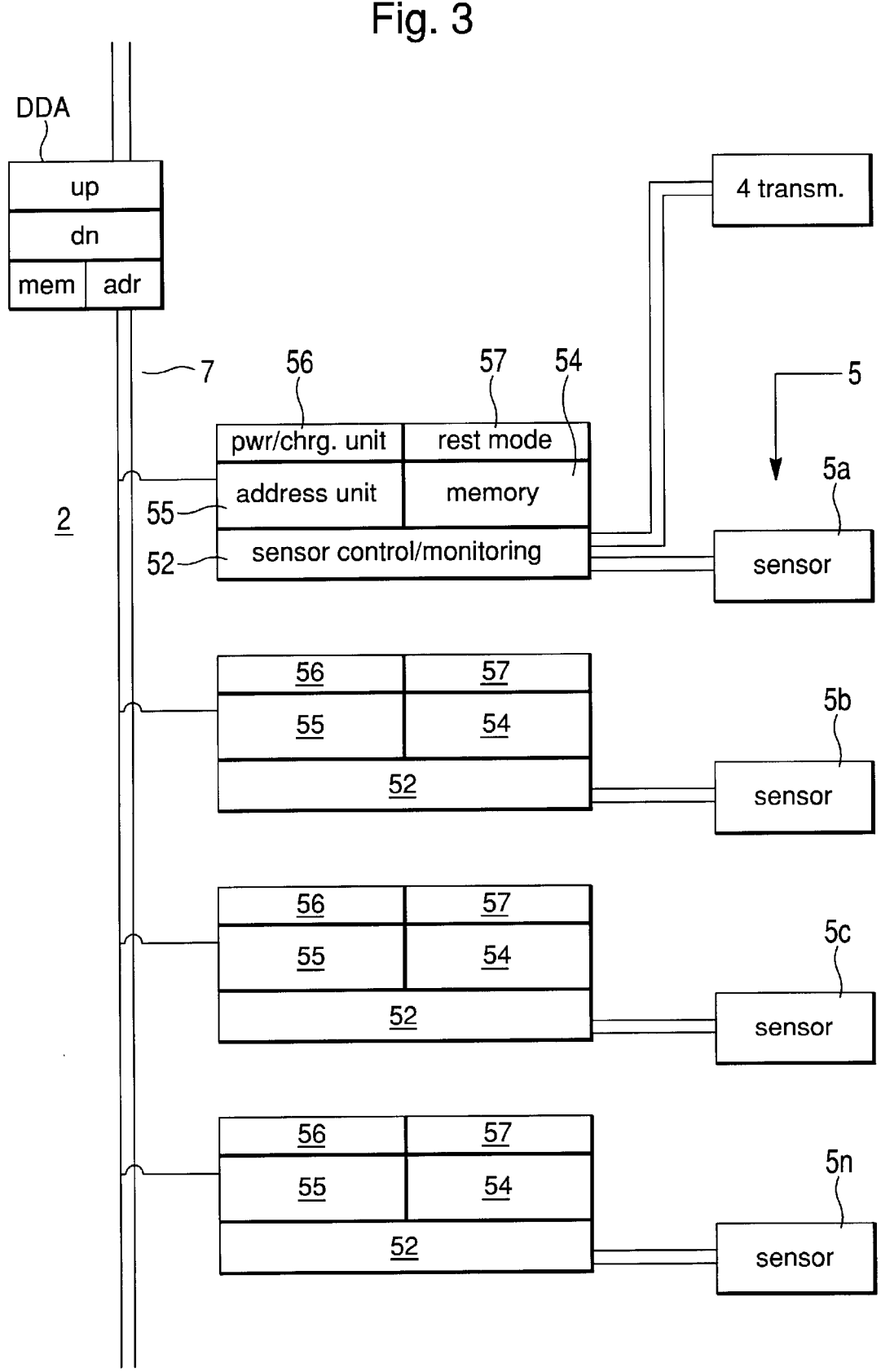
FIG. 3 displays an addressed control unit on a so-called communication bus for use in a preferred embodiment of the invention. Each control unit may have connected one transmitter antenna and at least one sensor.

By each resistivity sensor may be connected an addressable control unit 52 displayed in FIG. 3 and FIG. 9. Resistivity sensors (5a, 5b, . . . , 5n) may be connected in pairs to each of their control units 52, possibly together with one transmitter antenna 4. The control unit 52 may comprise at least one memory 54, and address unit 55, and energy/charging unit 56 and a rest mode unit 57, and may be connected via the signal conductor 7 with e.g. the registration unit 70 which may be situated down by the reservoir, by the wellhead at the seabed, on a platform or at a ship having signal communication with the wellhead and further down to the sensor series 5. In one embodiment each resistivity sensor (5a, 5b, . . . , 5n) may be connected to a respective control unit 52. In another embodiment all the resistivity sensor may be connected to one single control unit 52. Due to effect- and signal capacity limitations between the particular components and the registration unit 70, and further between the registration unit and the surface, each control unit may be set into or out of rest mode by a command to the rest mode unit 57. In such manner may each sensor may be controlled to give measurement signals upon command.

Modular Embodiment.

In one preferred embodiment one inductive transmitter antenna 4 and preferably one sensor series 5 comprising n=2 inductive resistivity sensors (5a, 5b) are arranged in a module 8 arranged for being combined in selected combinations of modules 8 and other wellpipe parts together constituting a wellpipe 3. Because one usually knows the position of the reservoir very well in injection- and production wells, modules 8 are entered into the well completion string 3 before the entire string is installed in the well. The signal conductor 7 and the control units 52 including the registration unit 70 may be arranged in ready milled tracks on the wellpipe 3 and its modules 8, or such tracks may be prefabricated on the wellpipe 3 and its modules 8. When the wellpipe 3 is arranged in the well 2 it is fixedly cemented to the wall of the borehole in the ordinary way.

Electrical Embodiment.

The sensor series with the resistivity sensors (5a, 5b, . . . , 5n) consists in a preferred embodiment preferably of electrical coil antennas, preferably pairs of resistivity sensors (5a, 5b) with n=2.

The inductive transmitter antenna 4 for electromagnetic waves 40 is in a preferred embodiment arranged for transmission of coherent continuous electromagnetic waves. A preferred frequency range for the electromagnetic waves is from 1 to 20 MHz, but other frequency ranges are not excluded. In an additionally preferred embodiment of the invention the inductive transmitter antenna 4 is arranged for emission of electromagnetic waves in the frequency range 2–8 MHz. In alternative embodiments the emission of the signals may take place by means of sweep signals inside the preferred frequency range. An additional alternative embodiment of the invention may be arranged to emit electromagnetic pulses, e.g. by means of a pulse transmitter such as disclosed in U.S. Pat. No. 4,849,699, which is hereby incorporated by reference in its entirety. In the mentioned U.S. patent the pulse transmitter is designed into a logging tool being by definition arranged to be displaced through a borehole or a lined well.

Figure 4:
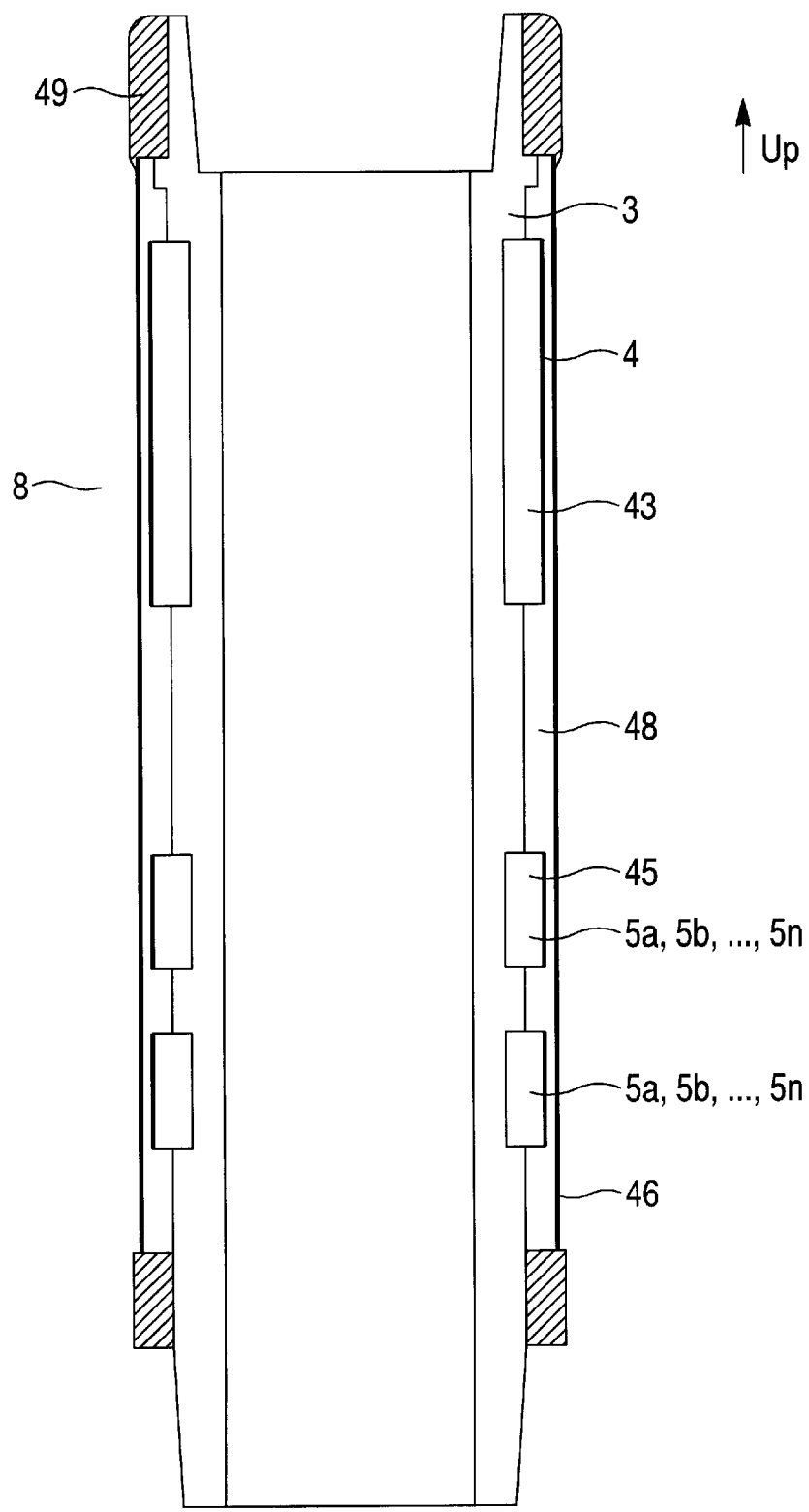
FIG. 4 shows a first preferred embodiment of the invention, a module of a wellpipe comprising a transmitter antenna and two receiver antennas in the form of coils around the wellpipe.
Figure 5:
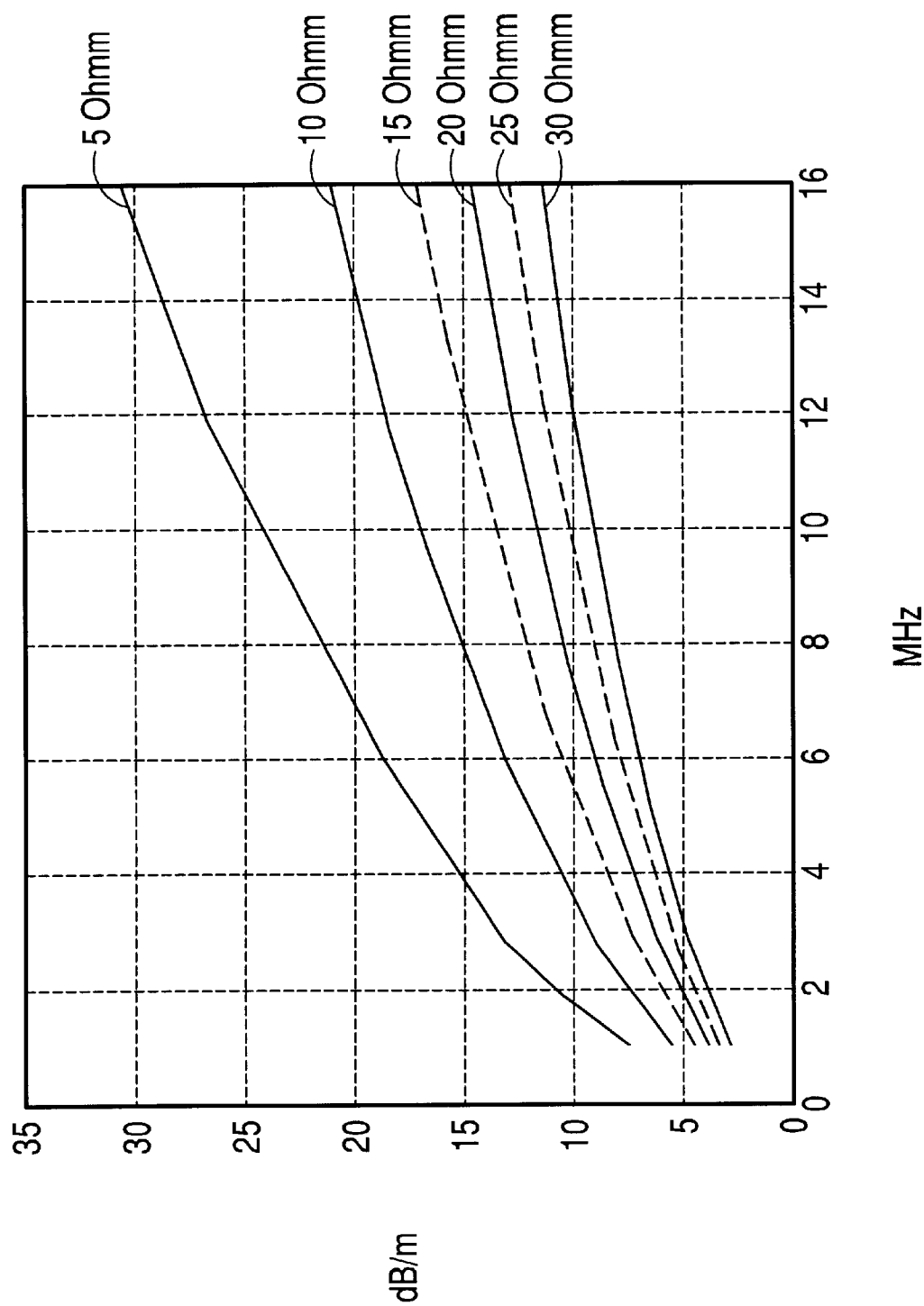
FIG. 5 is a diagram of attenuation of electromagnetic waves in a conductive medium, e.g. a rock, with resistivities in the range between 30 $\Omega$m and 5 $\Omega$m, by a relative dielectric constant of 6, for frequencies between 1 MHz and 16 MHz.
Figure 6:
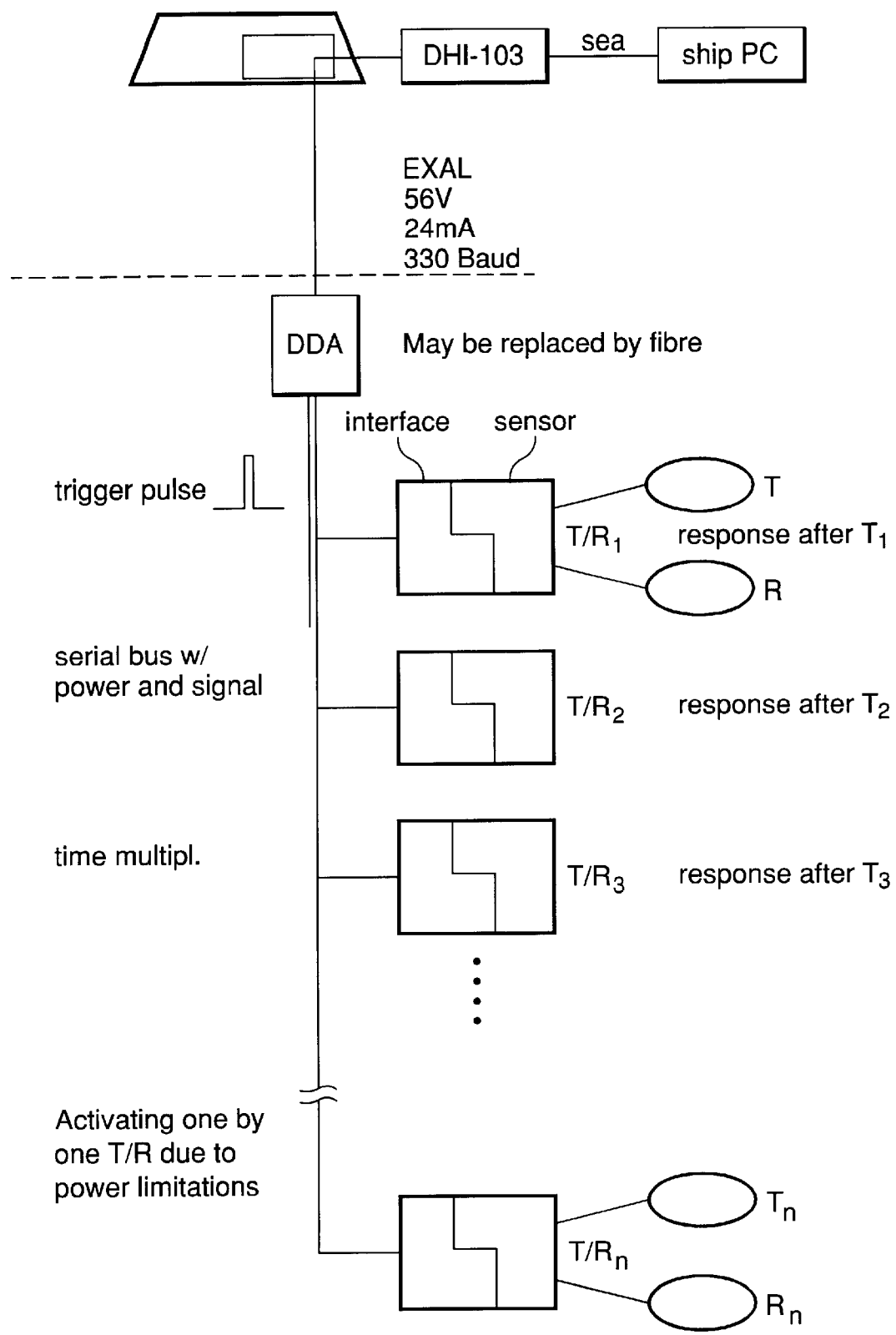
FIG. 6 shows an illustration of a possible embodiment according to the invention, of the energy supply and the signal transport from the resistivity sensors to the surface.

A ceramic isolator 43 is arranged between the metallic wellpipe 3 and the inductive transmitter antenna 4. This is displayed in FIG. 4, with the module 8 having milling-cut cut-outs in the wellpipe 3 in a cylindrical volume under the transmitter antenna 4. A corresponding ceramic isolator 45 is arranged between the metallic wellpipe 3 and each of the resistivity sensors (5a,5b, . . . , 5n). In order to protect and isolate the antennas and the sensors, an isolating sleeve 46 is arranged outside on the inductive transmitter antenna 4 and the resistivity sensors (5a, 5b, . . . , 5n). This isolating sleeve 46 does not necessarily need to be continuous between the transmitter antenna 4 and the resistivity sensors (5a, 5b, . . . , 5n) internally. A hydraulically balancing cavity 48, filled preferrably with silicone oil, is arranged between the metallic wellpipe 3 with the inductive transmitter antenna 4 and the resistivity sensors (5a,5b, . . . , 5n), and the electrically isolating sleeve 46. This cavity's liquid distributes pressure and reduces mechanical shear forces so that it protects the module's electrical components.

On the modules 8 are found in a preferred embodiment of the invention elastic centralizers 49 arranged near each inductive transmitter antenna or sensor series 5, preferably in at least one end of each module 8.

Energy Supply and Signal Transport.

The energy supply may happen from the outside of the well, but in a preferred embodiment of the invention is applied a local energy source or accumulator 10' and an energy supply conductor 10 by the inductive transmitter antenna 4. The energy source or accumulator 10 may be charged via energy supply conductors (not shown) from the surface. In a preferred embodiment of the invention, illustrated in FIG. 9, all signal transmission and energy supply between e.g. a well frame at the seabed or generally on the surface and the well via a so-called EXAL-bus having a highest signal speed of 300 Baud and up to 56 V voltage and 24 mA maximum current. In the well frame may be arranged a communication card of the type DHI-103 using this EXAL-bus. An alternative to the communication card DHI-103 is a corresponding one named DIH-107 having five times higher effect.

Alternative Embodiment.

In an alternative embodiment of the invention illustrated in FIG. 2b, the transmitter antenna 4 may consist of a high-effect pulse emitting capacitive coil, preferably wound around the wellpipe 3 in a way corresponding to the description in MPI's U.S. Pat. No. 4,849,699 for a logging tool. This capacitive coil is arranged for slow charging with the capacity permitted by the energy supply and signal conductors, and arranged for time-controlled discharge via a spark gap. Such a transmitter antenna 4 will have a very large effect and will give an electromagnetic pulse reaching far down into the geological formation.

In an alternative embodiment there may be arranged an optical fiber 7 constituting a signal conductor 7 for communication between the resistivity sensors (5a, 5b, . . . , 5n) and a registration unit 70 for signals 42 which represent the electromagnetic waves 40 sensed by the resistivity sensors (5a, 5b, . . . , 5n). Each resistivity sensor (5a, 5b, . . . , 5n) may be constituted by a magnetic coating on Bragg-gratings 50 arranged to couple changes of the inducing electromagnetic field to changes in the optical Bragg-grating 50. Each Bragg-grating constituting a part of each resistivity sensor (5a, 5b, . . . , 5n) on the optical cable has each its discrete internal grating separation different from the other resistivity sensors (5a, 5b, . . . , 5n). Mechanical vibrations will be induced on the Bragg-grating so that the internal grating separation will vibrate about the initial separation. In this way a broad-spectered optical pulse from e.g. registration unit 70. Each resistivity sensor (5a, 5b, . . . , 5n) then will "respond" on the optical pulse by reflecting the locally sensed electromagnetic frequency and amplitude and phase as signals 42 modulated in each of their frequency bands on the broad-spectered optical pulse. The signals 42 represent the electromagnetic waves 40 sensed by the resistivity sensors (5a, 5b, ..., 5n). This is possible because the broad-spectered optical pulse has a very rapidly vibrating frequency in the nanometer range, while the electromagnetic pules as mentioned above reside between 2 to 10 meters. The signals 44 may be transformed e.g. to digital signal representations 44. Thus it is in the alternative embodiment of the invention possible to perform several readings by many resistivity sensors (5a, 5b, ..., 5n) simultaneously via one single optical cable. This optical cable may alternatively lead the entire way from the sensors 5 to the surface.

Signal Processing.

The transmitter antenna will radiate energy in all directions out into the formation. Depending on the wavelength of the emitted signal there will be one corresponding critical angle leading to refraction of the electromagnetic wavelength so that the energy propagation takes place in the geological formation 9 near the wall of the borehole. This refracted wave will radiate out and back again from the borehole wall and be sensed by the sensors (5a, 5b, ..., 5n). Reflections along the refracted path will be a pure loss in this measurement process. This refracted wave will be the first arrival to the sensors, and in a preferred embodiment this first arrival constitutes the electromagnetic radiation being most suitable for the purpose for the invention. Reflections from more remotely situated parts of the formation will arrive later and will thus be disregarded. Further, reflections will, in most actual considerations, be several dB lower than the refracted wave, so that the reflected waves will have little effect on the part of the measurement signal which according to the invention will be transformed to registered signals which should represent the resistivity.

Method of Resistivity Measurement.

A preferred embodiment of the invention consists basically of a method for measurement of resistivity in a petroleum reservoir 1 in a geological formation 9 with an injection-, observation- or production well 2 by means of a device as described in earlier embodiments. The method comprises the following steps:

i) emission of electromagnetic waves 40 from the inductive transmitter antenna 4 to preferably the upper part of the petroleum reservoir 1, ii) reception of electromagnetic waves 40 by a sensor series 5 of n inductive resistivity sensors (5a, 5b, ..., 5n) arranged by the petroleum reservoir 1;

iii) generation of signals 42 representing the electromagnetic waves 40 sensed by the resistivity sensors (5a, 5b, ..., 5n); and iv) registration of signal representations 44 of the signals 42.

Primarily the refracted part of the electromagnetic waves 40 will be applied for generating signals 42, further being transformed to signal representations 44. The resistivity may be calculated on the basis of the amplitude and the phase of the received waves 40. The signal representations 44 will according to a preferred embodiment of the invention be drafted as a log of resistivity in the reservoir. In order to trace the development in the reservoir during time, the operation may utilize a method comprising the following steps:

a) a first performance of the steps (i–iv) according to the method described above;

b) storage of the first signal representations $44_1$;

c) a second performance of the steps (i–iv) according to the method mentioned above;

d) storage of the second signal representations $44_2$;

e) formation of a difference between the second signal representations $44_2$ and the first signal representations $44_1$;

f) interpretation of the difference with regard to changes in liquid surfaces, preferably those of an oil/water contact's (OWC), level in the reservoir 1.

Figure 7:
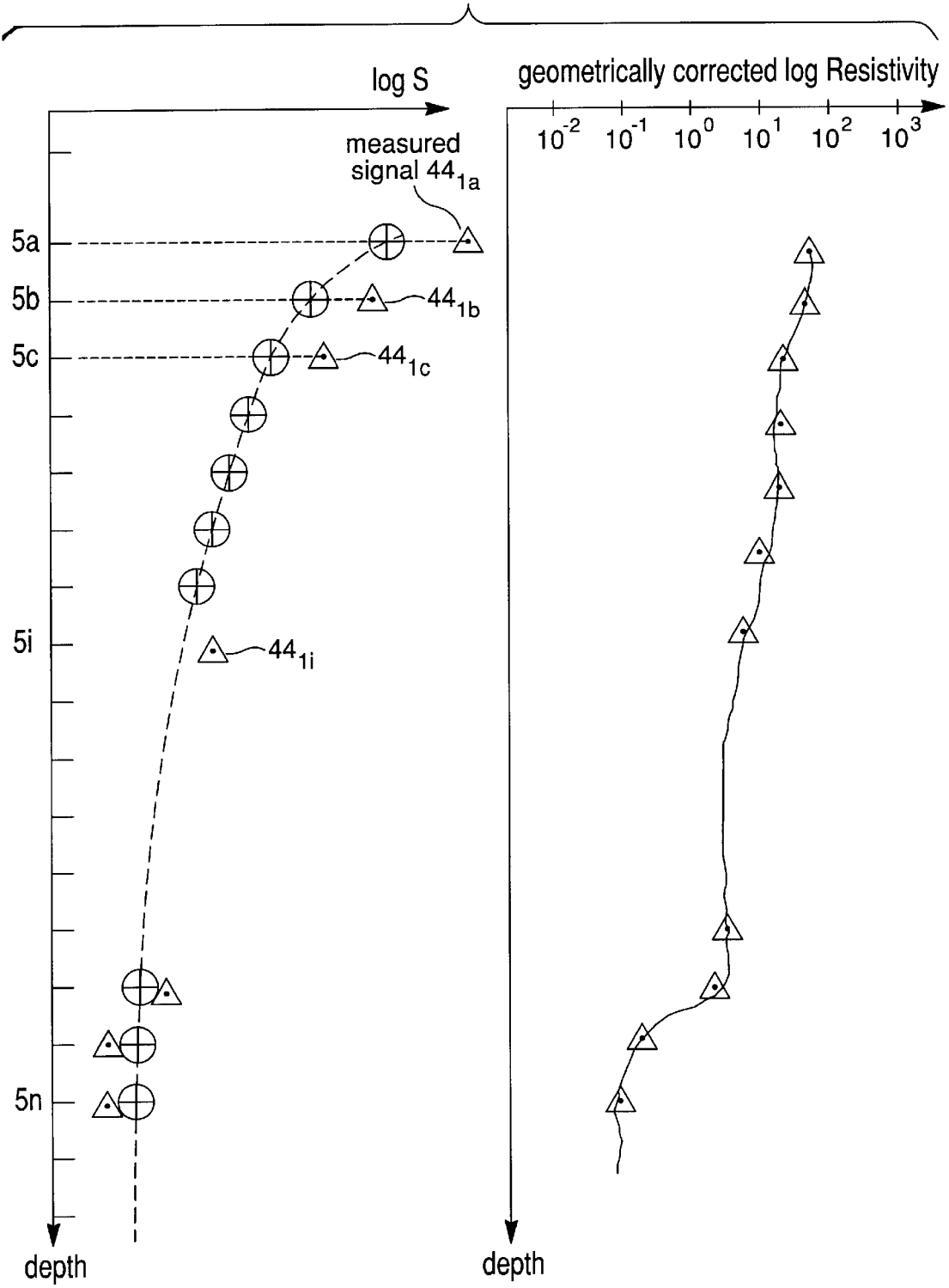
FIG. 7 displays an illustrated imagined log of resistivity measured according to the invention.
Figure 8:
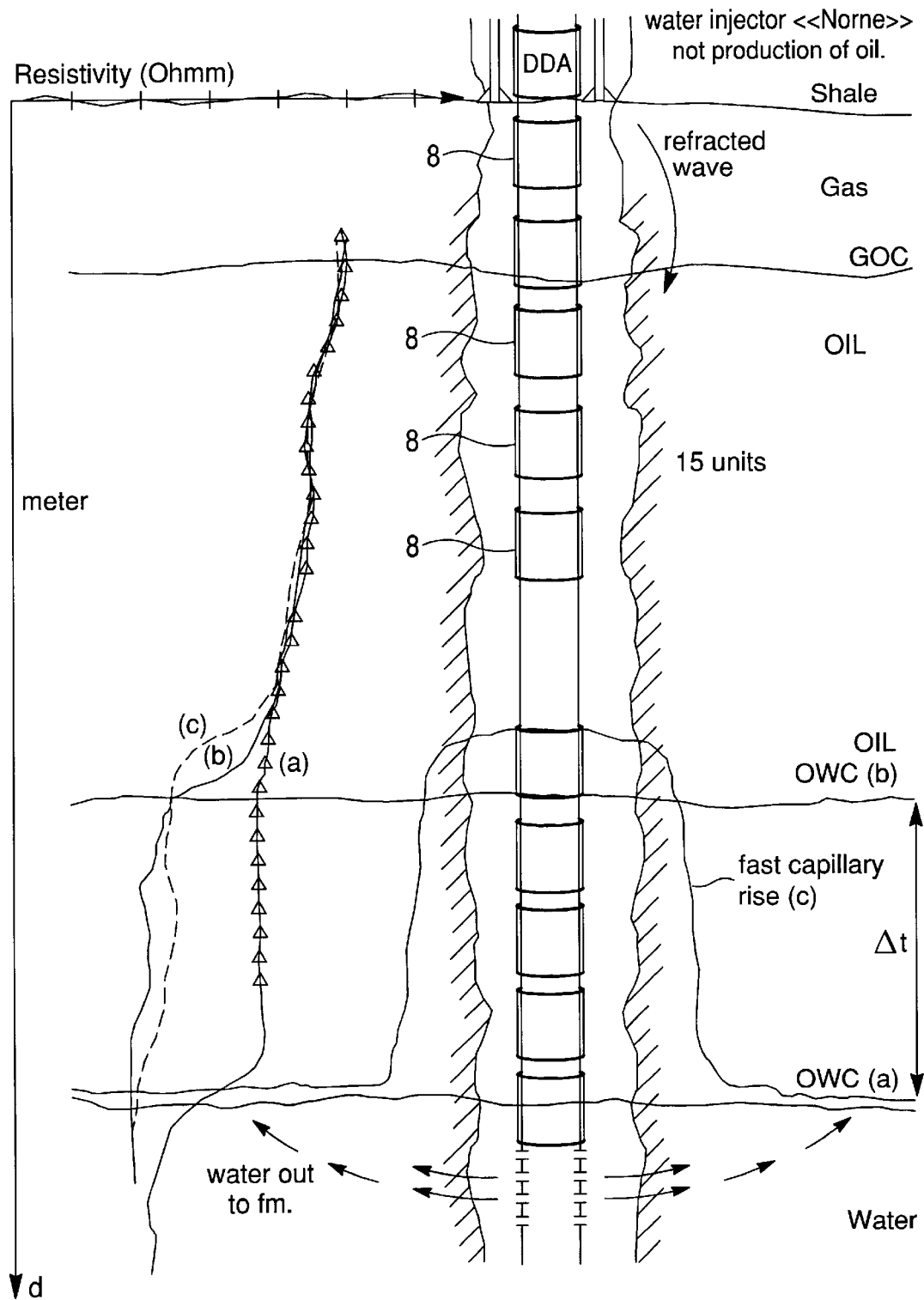
FIG. 8 displays an illustration of an imagined injection well in a geological formation with a schist barrier above a gas-, oil- and water-bearing formation, with a wellpipe pumping water into the water-bearing part of the formation. A series of modules of an embodiment according to the invention is arranged along the wellpipe. Imagined logs of resistivity are displayed by the graphs (a) early in the injection phase and (b) later in the injection phase, and a graph (c) indicating remaining oil removal.

With one transmitter antenna 4 and a long series of resistivity sensors (5a, 5b, ..., 5n) corrections should be made for geometrical, approximately spherical or cylindrical dispersion of the electromagnetic wave before the log is drafted on the basis of the measurements or the signal representations, such as illustrated in FIG. 7. By interpretation of the difference it is however in one basic embodiment only the relative changes of the signal between the signal representations $44_1$, $44_2$, ..., $44_t$ as a development through time, measured at each particular sensor of the sensors (5a, 5b, ..., 5n) being necessary to monitor the movements of the oil/water contact. With a series of modules 8 arranged along the wellpipe 3 it will preferably be equal separation between each pair of transmitter antenna and resistivity sensor $5_i$ in the sensor series 5. Thus an observation log may be drafted on the basis of the pair by pair measurement of resistivity without need to make geometrical correction of the measurements.

Figure 10A:
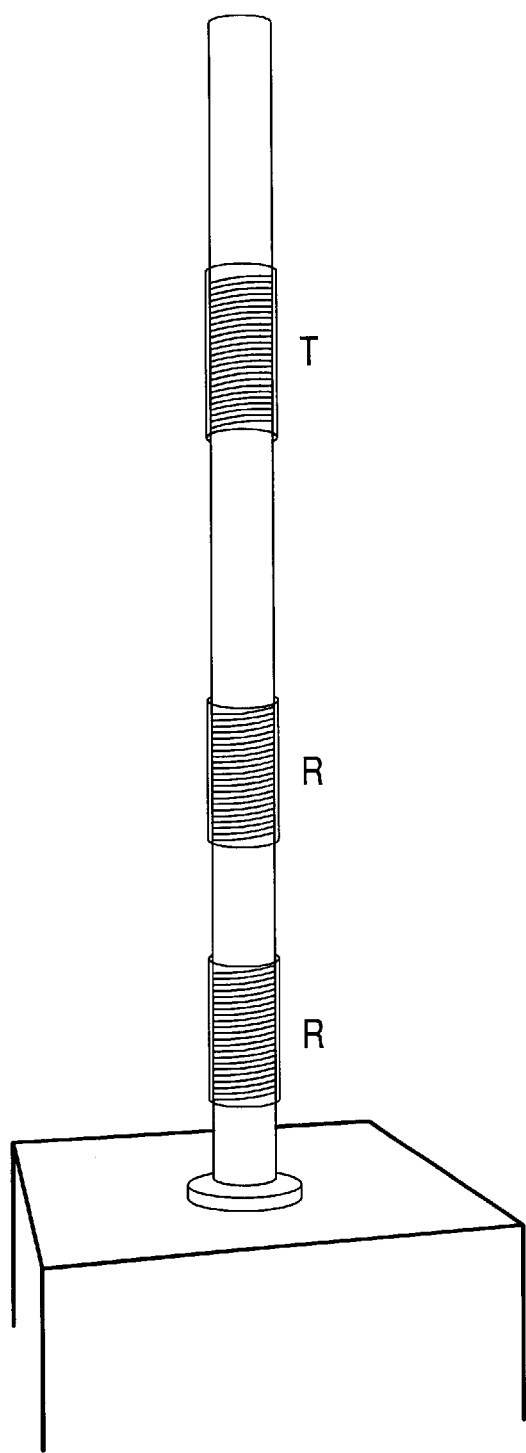
FIGS. 10a, 10b, and 10c show a laboratory model of a preferred modular embodiment according to the invention. The laboratory model is constructed in scale 1:3.
Figure 10B:
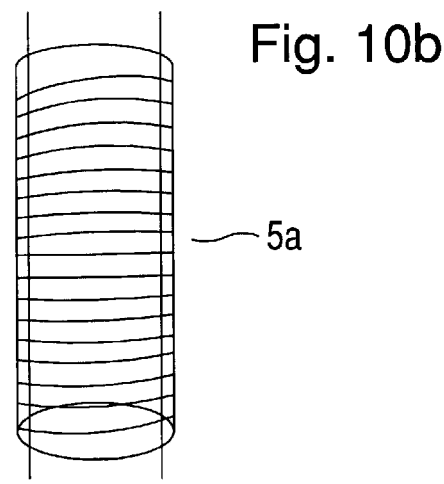
Figure 10C:
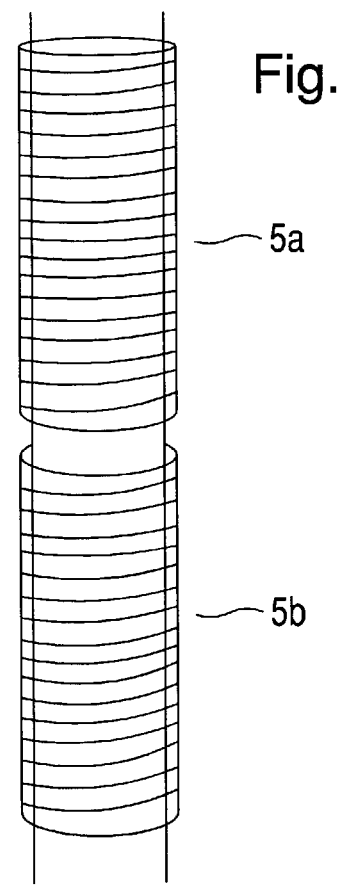

FIGS. 10a, 10b, and 10c illustrate a laboratory model of a preferred modular embodiment according to the invention. The laboratory model is designed in scale 1:3.

The above mentioned embodiments are to be considered as non-limiting examples of possible embodiments of the invention. The invention is only limited by the attached patent claims.

What is claimed is:

1. A device for measuring and monitoring the resistivity in a petroleum reservoir in a geological formation having a well with an electrically conductive metallic wellpipe having an outer metallic surface, the well being one of an injection well, observation well, and a production well, the device comprising:

a) an electrical energy source;

b) at least one inductive transmitter antenna that transmits electromagnetic waves, fixedly arranged outside the outer metallic surface;

c) at least one sensor series comprising a plurality of resistivity sensors fixedly arranged outside the outer metallic surface and arranged with a mutual separation lengthways along the borehole, the plurality of resistivity sensors receiving the electromagnetic waves transmitted from the at least one inductive transmitter antenna and generating measurement signals, the plurality of resistivity sensors being one of inductive, magnetorestrictive and electrostrictive resistivity sensors;

d) a signal conductor for receiving the measurement signals from the at least one sensor series;

e) devices giving a volumetric measurement of resistivities in the petroleum reservoir based on the measurement signals;

f) an electrically isolating sleeve arranged outside of the at least one sensor series and the at least one inductive transmitter antenna; and g) a hydraulically balancing cavity arranged between the outer metallic surface and the electrically isolating sleeve, wherein the hydraulically balancing cavity is filled with oil.

2. The device according to claim 1, wherein the at least one inductive transmitter antenna and the at least one sensor series are arranged in a module, the module adapted to be combined with other modules and wellpipe part to together constitute a wellpipe.

3. The device according to claim 1, wherein the plurality of resistivity sensors is a pair of resistivity sensors.

4. The device according to claim 1, wherein the at least one inductive transmitter antenna emits coherent continuous electromagnetic waves.

5. The device according to claim 1, wherein the at least one inductive transmitter antenna emits electromagnetic waves in the frequency range of 1 to 20 MHz.

6. The device according to claim 5, wherein the at least one inductive transmitter antenna emits electromagnetic waves in the frequency range of 2 to 8 MHz.

7. The device according to claim 5, wherein the at least one inductive transmitter antenna emits electromagnetic waves stepwise at different frequencies.

8. The device according to claim 1, wherein the at least one inductive transmitter antenna emits electromagnetic waves by sweeping a continuously varying frequency in the frequency range of 1 to 20 MHz.

9. The device according to claim 1, further comprising:
a ceramic isolator arranged between the outer metallic surface and the at least one inductive transmitter antenna.

10. The device according to claim 1, further comprising:
a ceramic isolator arranged between the outer metallic surface and the at least one sensor series.

11. The device according to claim 1 wherein the oil is silicone oil.

12. The device according to claim 1, further comprising:
elastic centralizers arranged near the at least one inductive transmitter antenna.

13. The device according to claim 1, further comprising:
elastic centralizers arranged near the at least one sensor series.

14. The device according to claim 1, further comprising:
at least one addressable control unit, each addressable control unit of the at least one addressable control units connected to a respective sensor series of the at least one sensor series, where each addressable control unit of the at least one addressable control units comprises:
a memory;
an address unit;
an energy/charging unit; and
a rest mode unit; and
wherein each addressable control unit of the at least one addressable control units is connected via the signal conductor to a registration unit that provides signal representations of the measurement signals.

15. The device according to claim 14, wherein the at least one inductive transmitter antenna is connected to each addressable control unit of the at least one addressable control units.

16. The device according to claim 1, further comprising:
a first energy supply conductor; and
wherein the first energy supply conductor and the electrical energy source are arranged by the at least one inductive transmitter antenna.

17. The device according to claim 16, wherein the first energy supply conductor and the at least one inductive transmitter antenna provide a rapid electromagnetic pulse discharge with high effect.

18. The device according to claim 16, further comprising:
a second energy supply conductor supplying energy from a surface installation to the electrical energy source.

19. The device according to claim 1, wherein the plurality of resistivity sensors are arranged for the generation of measurement signals based on the first arrival of refracted electromagnetic waves.

20. The device according to claim 1, wherein the at least one inductive transmitter antenna comprises a high-effect pulse emitting capacitive coil.

21. The device according to claim 1, wherein the signal conductor comprises an optical fiber that allows communication between the at least one sensor series and a registration unit that provides signals representing the measurement signals from the at least one sensor series.

22. The device according to claim 1, wherein plurality of resistivity sensors are optical resistivity sensors comprising a magnetic coating on a Bragg-grating, the optical resistivity sensors arranged to transform changes in electromagnetic waves to physical changes in the Bragg-grating.

23. A method for measurement of resistivity in a petroleum reservoir in a geological formation having a well with an electrically conductive metallic wellpipe having an outer metallic surface, the well being one of an injection well, observation well, and a production well, the method comprising the steps of:
a) performing M series of measuring steps where M is greater than or equal to 2 to provide a first through Mth signal representation, each series of the M series of measuring steps comprising the substeps:
a1) emitting electromagnetic waves from an inductive transmitter antenna to the petroleum reservoir;
a2) receiving electromagnetic waves by a sensor series, the sensor series comprising a plurality of resistivity sensors fixedly arranged outside the outer metallic surface and arranged lengthways along the borehole, the plurality of resistivity sensors being one of inductive, magnetorestrictive and electrostrictive resistivity sensors;
a3) generating measurement signals representing the electromagnetic waves sensed by the plurality of resistivity sensors;
a4) registering a signal representation of the measurement signals; and
a5) storing the signal representation;
b) forming a difference between the second and later signal representations and a respective preceding representation; and
c) interpreting the difference with regard to changes in the position of liquid surfaces in the reservoir.

24. The method according to claim 23 wherein the liquid surfaces are those of an oil/water contact.

25. The method according to claim 23, further comprising:
calculating the volumetric resistivity on the basis of the measurement signals or the signal representations.

26. A device for measuring and monitoring the resistivity in a petroleum reservoir in a geological formation having a well with an electrically conductive metallic wellpipe having an outer metallic surface, the well being one of an injection well, observation well, and a production well, the device comprising:
a) an electrical energy source;
b) at least one inductive transmitter antenna that transmits electromagnetic waves, fixedly arranged outside the outer metallic surface;
c) at least one sensor series comprising a plurality of resistivity sensors fixedly arranged outside the outer metallic surface and arranged with a mutual separation lengthways along the borehole, the plurality of resistivity sensors receiving the electromagnetic waves transmitted from the at least one inductive transmitter antenna and generating measurement signals, the plurality of resistivity sensors being one of inductive, magnetorestrictive and electrostrictive resistivity sensors;

d) a signal conductor for receiving the measurement signals from the at least one sensor series;

e) devices giving a volumetric measurement of resistivities in the petroleum reservoir based on the measurement signals;

f) an electrically isolating sleeve arranged outside of the at least one sensor series and the at least one inductive transmitter antenna; and g) a hydraulically balancing cavity arranged between the outer metallic surface and the electrically isolating sleeve.

* * * * *